United States Patent
Min et al.

(10) Patent No.: US 9,065,151 B2
(45) Date of Patent: Jun. 23, 2015

(54) MANUFACTURE DEVICE OF BATTERY CELL

(71) Applicant: LG CHEM, LTD., Seoul (KR)

(72) Inventors: Ki Hong Min, Gwacheon-si (KR); Jeong Sam Son, Cheongju-si (KR); Sung Min Hwang, Cheongju-si (KR); Jihoon Cho, Daejeon (KR); Changmin Han, Cheongju-si (KR); Han Sung Lee, Incheon (KR); Byeong Geun Kim, Anyang-si (KR); Jae Hoon You, Cheongju-si (KR); Su Taek Jung, Cheongju-si (KR); Hyun-sook Baik, Cheongju-si (KR); Seok Joo Jung, Cheongju-si (KR); Ki Hun Song, Hwaseong-si (KR); Sang Hyuck Park, Suwon-si (KR)

(73) Assignee: LG CHEM, LTD., Seoul (KR)

( * ) Notice: Subject to any disclaimer, the term of this patent is extended or adjusted under 35 U.S.C. 154(b) by 46 days.

(21) Appl. No.: 13/896,357

(22) Filed: May 17, 2013

(65) Prior Publication Data
US 2013/0252069 A1    Sep. 26, 2013

Related U.S. Application Data

(63) Continuation of application No. PCT/KR2011/008486, filed on Nov. 9, 2011.

(30) Foreign Application Priority Data

Dec. 2, 2010    (KR) .................... 10-2010-0122329

(51) Int. Cl.
*B23P 19/00* (2006.01)
*H01M 10/14* (2006.01)
(Continued)

(52) U.S. Cl.
CPC ...... *H01M 10/0585* (2013.01); *Y10T 29/53135* (2015.01); *H01M 2/1072* (2013.01);
(Continued)

(58) Field of Classification Search
USPC ......................... 29/623.1; 429/157, 158, 159
IPC ...................... H01M 10/0404,10/0585, 2/1072
See application file for complete search history.

(56) References Cited

U.S. PATENT DOCUMENTS

| 4,314,403 A | 2/1982 | Sanekata |
|---|---|---|
| 5,177,931 A | 1/1993 | Latter |

(Continued)

FOREIGN PATENT DOCUMENTS

| CN | 101150203 A | 3/2008 |
|---|---|---|
| CN | 101218694 A | 7/2008 |

(Continued)

OTHER PUBLICATIONS

International Search Report issued in PCT/KR2011/008486, mailed on Jun. 1, 2012.
(Continued)

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed herein is a battery cell manufacturing device configured to manufacture a battery cell including two or more unit cells. The battery cell manufacturing device includes a unit cell stacking unit into which unit cells are introduced from above and in which the unit cells are sequentially stacked, a wrapping unit to wrap an outside of the unit cell stack discharged from the unit cell stacking unit with a separation film, and a heating unit to thermally shrink the separation film wrapping the outside of the unit cell stack.

15 Claims, 3 Drawing Sheets

(51) Int. Cl.
   *H01M 4/82*   (2006.01)
   *H01M 6/00*   (2006.01)
   *H01M 6/42*   (2006.01)
   *H01M 2/24*   (2006.01)
   *H01M 10/0585* (2010.01)
   *H01M 10/04*  (2006.01)
   *H01M 10/052* (2010.01)
   *H01M 2/02*   (2006.01)
   *H01M 2/10*   (2006.01)

(52) U.S. Cl.
   CPC ...... *H01M10/0404* (2013.01); *H01M 10/0413* (2013.01); *H01M 10/052* (2013.01); *Y02T 10/7011* (2013.01); *Y02E 60/122* (2013.01); *H01M 2/0267* (2013.01); *H01M 2/1077* (2013.01)

(56) References Cited

U.S. PATENT DOCUMENTS

| | | | |
|---|---|---|---|
| 5,670,272 | A | 9/1997 | Cheu et al. |
| 2004/0154160 | A1 | 8/2004 | Hong |
| 2006/0275661 | A1 | 12/2006 | Kim et al. |
| 2006/0292443 | A1* | 12/2006 | Ogg et al. ............ 429/185 |
| 2007/0180691 | A1 | 8/2007 | Dixon et al. |
| 2007/0184350 | A1 | 8/2007 | Kim et al. |

FOREIGN PATENT DOCUMENTS

| | | |
|---|---|---|
| CN | 100583514 C | 1/2010 |
| JP | 9-66909 A | 3/1997 |
| JP | 10-86902 A | 4/1998 |
| JP | 2000-326912 A | 11/2000 |
| JP | 2002-110239 A | 4/2002 |
| JP | 2002-208442 A | 7/2002 |
| JP | 2004-527095 A | 9/2004 |
| KR | 10-2001-0082058 A | 8/2001 |
| KR | 10-2001-0082059 A | 8/2001 |
| KR | 10-2001-0082060 A | 8/2001 |
| KR | 10-2004-0033713 A | 4/2004 |
| TW | 200818567 A | 4/2008 |
| TW | I360251 B | 3/2012 |
| WO | WO 02/095858 A1 | 11/2002 |
| WO | 2006/014989 A2 | 2/2006 |

OTHER PUBLICATIONS

Chinese Office Communication for corresponding Chinese Application No. 201180057352.5 dated Jan. 30, 2015 (with English translation).

* cited by examiner

MANUFACTURE DEVICE OF BATTERY CELL

CROSS REFERENCE TO RELATED APPLICATIONS:

This application is a Continuation of PCT International Application No. PCT/KR2011/008486 filed on Nov. 9, 2011, which claims priority under 35 U.S.C. §119(a) to Patent Application No. 10-2010-0122329 filed in the Republic of Korea on Dec. 2, 2010, all of which are hereby expressly incorporated by reference into the present application.

TECHNICAL FIELD

The present invention relates to a battery call manufacturing device, and, more particularly, to a battery cell manufacturing device configured to manufacture a battery cell including unit cells, the battery cell manufacturing device including a unit cell stacking unit into which unit cells are introduced from above and in which the unit cells are sequentially stacked, a wrapping unit to wrap an outside of the unit cell stack discharged from the unit cell stacking unit with a separation film, and a heating unit to thermally shrink the separation film wrapping the outside of the unit cell stack.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-In HEV), which have been developed to solve problems, such as air pollution, caused by existing gasoline and diesel vehicles using fossil fuel.

Based on their external and internal structures, secondary batteries may be generally classified into a cylindrical battery, a prismatic battery, and a pouch-shaped battery. Especially, the prismatic battery and the pouch-shaped battery, which can be stacked with high integration and have a small width to length ratio, have attracted considerable attention.

An electrode assembly having a cathode/separator/anode structure, which constitutes a secondary battery, may be generally classified as a jelly-roll (winding) type electrode assembly or a stack type electrode assembly, based on the structure of the electrode assembly. The jelly-roll type electrode assembly is manufactured by coating a metal foil to be used as a current collector with an electrode active material, drying and pressing the coated metal foil, cutting the dried and pressed metal foil into the form of a band having a predetermined width and length, isolating an anode and a cathode from each other using a separator, and helically winding the anode/separator/cathode structure. The jelly-roll type electrode assembly is suitable for a cylindrical battery; however, the jelly-roll type electrode assembly is not suitable for a prismatic battery or a pouch-shaped battery because stress locally concentrates on the battery with the result that the electrode active material is detached, or the battery may be deformed due to repetitive contraction and expansion of the battery caused during charge and discharge of the battery On the other hand, the stack type electrode assembly is configured to have a structure in which a plurality of unit cathodes and a plurality of unit anodes are sequentially stacked. The stack type electrode assembly has an advantage in that the stack type electrode assembly can be configured to have a prismatic structure; however, the stack type electrode assembly has disadvantages in that a process for manufacturing the stack type electrode assembly is complicated, and, when external impact is applied to the stack type electrode assembly, electrodes of the stack type electrode assembly are pushed with the result that a short circuit may occur in the stack type electrode assembly.

In order to solve the above-described problems, there has been developed an improved electrode assembly which is a combination of the jelly-roll type electrode assembly and the stack type electrode assembly, i.e. a stack/folding type electrode assembly configured to have a structure in which full cells having a cathode/separator/anode structure of a predetermined unit size or bicells having a cathode (anode)/separator/anode (cathode)/separator/cathode (anode) structure of a predetermined unit size are folded using a long continuous separator sheet. Examples of such a stack/folding type electrode assembly are disclosed in Korean Patent Application Publication No. 2001-82058, No. 2001-82059, and No. 2001-82060, which have been filed in the name of the applicant of the present patent application.

In the stack/folding type electrode assembly, however, the unit cells are arranged on the long continuous separator sheet, and the unit cells and the separator sheet are folded while the unit cells and the separator sheet are held at opposite ends thereof. Consequently, a space and a system necessary to carry out such manufacturing processes are essentially required, and therefore, a manufacturing method is very complicated, and equipment investment costs are high.

Therefore, there is a high necessity for a battery cell manufacturing device that is capable of improving manufacturing processability while minimizing manufacturing costs and improving capacity and quality of a battery as compared with another battery of the same standard.

DISCLOSURE

Technical Problem

Therefore, the present invention has been made to solve the above problems, and other technical problems that have yet to be resolved.

Specifically, it is an object of the present invention to provide a battery cell manufacturing device having a novel structure that is capable of improving manufacturing processability while minimizing manufacturing cost and improving capacity and quality of a battery as compared with another battery of the same standard.

Technical Solution

In accordance with one aspect of the present invention, the above and other objects can be accomplished by the provision of a battery cell manufacturing device configured to manufacture a battery cell including two or more unit cells, the battery cell manufacturing device including a unit cell stacking unit into which unit cells are introduced from above and in which the unit cells are sequentially stacked, a wrapping unit to wrap an outside of the unit cell stack discharged from the unit cell stacking unit with a separation film, and a heating unit to thermally shrink the separation film wrapping the outside of the unit cell stack.

That is, the unit cells are easily stacked to constitute a unit cell stack, and the unit cell stack is discharged, wrapped with a separation film, and thermally shrunk. Consequently, it is possible to greatly improve battery cell manufacturing processability and to improve capacity and quality of a battery as compared with another battery of the same standard.

Each of the unit cells may be configured to have a structure in which two or more electrode plates are stacked in a state in which a separator is disposed between the electrode plates. For example, each of the unit cells may be configured to have a full cell structure in which the outermost electrode plates constitute opposite electrodes. Representative examples of the full cell structure may include a cathode/separator/anode structure and a cathode/separator/anode/separator/cathode/separator/anode structure.

According to circumstances, a bicell configured to have a structure in which the outermost electrode plates constitute the same electrode may be used as each of the unit cells. Representative examples of the bicell structure may include a cathode/separator/anode/separator/cathode structure (a C type bicell) and an anode/separator/cathode/separator/anode structure (an A type bicell).

In a case in which full cells are used as the unit cells, the full cells are stacked by the unit cell stacking unit so that opposite electrodes of the respective full cells face each other in a state in which a separation film is disposed between the respective full cells. In a case in which bicells are used as the unit cells, on the other hand, C type bicells and A type bicells are alternately stacked by the unit cell stacking unit so that opposite electrodes of the respective full cells face each other in a state in which a separation film is disposed between the respective bicells.

In a preferred example, the unit cell stacking unit may be configured to have a structure including a hopper type upper part, the upper end of which is open and the diameter of which is decreased in a downward direction, and a lower part having an interior size corresponding to the unit cell stack. Consequently, a plurality of unit cells collected at the upper part of the unit cell stacking unit may move to the lower part of the unit cell stacking unit by gravity and may be uniformly and vertically stacked at the lower part of the unit cell stacking unit.

In the above-described structure, the lower part of the unit cell stacking unit may be provided with a lower discharge port, through which the unit cell stack is sequentially discharged. The unit cell stack discharged through the lower discharge port may be easily wrapped with the separation film.

Specifically, the lower part of the unit cell stacking unit may be configured to have a structure having an inner diameter larger than electrode plates of each of the unit cells and smaller than a separator of each of the unit cells. When the unit cell stack moves downward along the lower part of the unit cell stacking unit, therefore, the unit cell stack moves downward with force corresponding to the gravity due to elasticity of the separator of each of the unit cells and frictional force against the inner wall of lower part of the unit cell stacking unit in a state in which the separator is in contact with the inner wall of the lower part of the unit cell stacking unit. Consequently, the unit cell stack can be sequentially stacked without being physically pushed.

Also, the lower part of the unit cell stacking unit may be provided with a step protrusion to support the separator of each of the unit cells. Consequently, if the unit cell stack exceeds the height of the step protrusion while the unit cell stack is sequentially stacked, the unit cell stack is discharged through the lower discharge port.

The structure of the step protrusion is not particularly restricted so long as the step protrusion can easily support the unit cell stack. For example, the step protrusion may be formed at the interface between the upper and lower parts of the unit cell stacking unit, a specific region of the lower part, or the lower discharge port of the lower part.

Meanwhile, the lower part of the unit cell stacking unit may be provided with through holes for exhaust. Consequently, air collected between the lower part of the unit cell stacking unit and the separator of the respective unit cells in contact with the inner wall of the lower part of the unit cell stacking unit is exhausted through the through holes, and therefore, the unit cell stack can easily move downward to the lower discharge port.

In a concrete example, the wrapping unit may include a jig to wrap the top or bottom of the unit cell stack with the separation film, a wrapping plate to continuously wrap the bottom or top of the unit cell stack with the separation film in a state in which the top or bottom of the unit cell stack is wrapped with the separation film by the jig, and a sealing block to thermally weld an overlapped portion of the separation film in a state in which the top and bottom of the unit cell stack are wrapped with the separation film.

The jig may include a main jig configured to contact the top or bottom of the unit cell stack and a side jig configured to contact a left side or right side of the unit cell stack. Consequently, it is possible form the jig to wrap the unit cell stack with the separation film while supporting the unit cell stack.

The wrapping plate may move from the side of the unit cell stack opposite to the side jig toward the side jig to wrap the unit cell stack with the separation film. Consequently, a manufacturing process is greatly simplified.

Also, the sealing block may move toward the side jig to thermally weld the overlapped portion of the separation film. The thermally welded separation film may be cut by the heat. According to circumstances, an additional cutter to cut the thermally welded separation film may be included.

The separation film may be disposed between the electrode plates of the unit cells and the unit cell stack to maintain insulation therebetween. For example, the separation film may be formed of polypropylene, a polypropylene copolymer or polypropylene blend. Also, the separation film may be configured to have a porous structure.

Meanwhile, the heating unit may be a high temperature chamber, which can thermally shrink the separation film wrapping the unit cell stack. The separation film, thermally shrunk by the high temperature chamber, may be fixed to the unit cell stack and may protect the unit cell stack from external impact.

The separation film may be thermally shrunk at a temperature range of, preferably, 150 to 180° C.

In an example, the unit cell stack may be transferred from the wrapping unit to the heating unit by a conveyor belt. Consequently, it is possible to easily realize an automated assembly line.

In accordance with another aspect of the present invention, there is provided a battery cell manufactured using the battery cell manufacturing device with the above-stated construction.

The battery cell may be a secondary battery or an electrochemical capacitor. Preferably, the battery cell is a lithium secondary battery.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
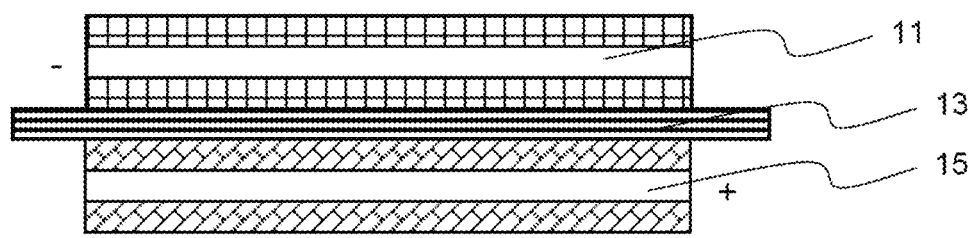
FIG. 1 is a typical view showing an exemplary full cell that is preferably used as a unit cell of an electrode assembly.

FIG. 1 is a typical view showing an exemplary full cell that can be preferably used as a unit cell of an electrode assembly.

Referring to FIG. 1, a full cell, as a unit cell 10, is a cell configured to have a unit structure of a cathode 15/separator 13/anode 11. The cathode 15 and the anode 11 are disposed at opposite sides of the cell. The full cell may be either a cell having a cathode/separator/anode structure, which is a basic structure, or a cell having a cathode/separator/anode/separator/cathode/separator/anode structure. A full cell having a cathode/separator/anode structure is shown in FIG. 1. In order to configure an electrochemical cell, including a secondary battery, using such a full cell, it is necessary to stack a plurality of full cells so that cathodes and anodes face each other while a separation film is disposed between the full cells.

Figure 2:
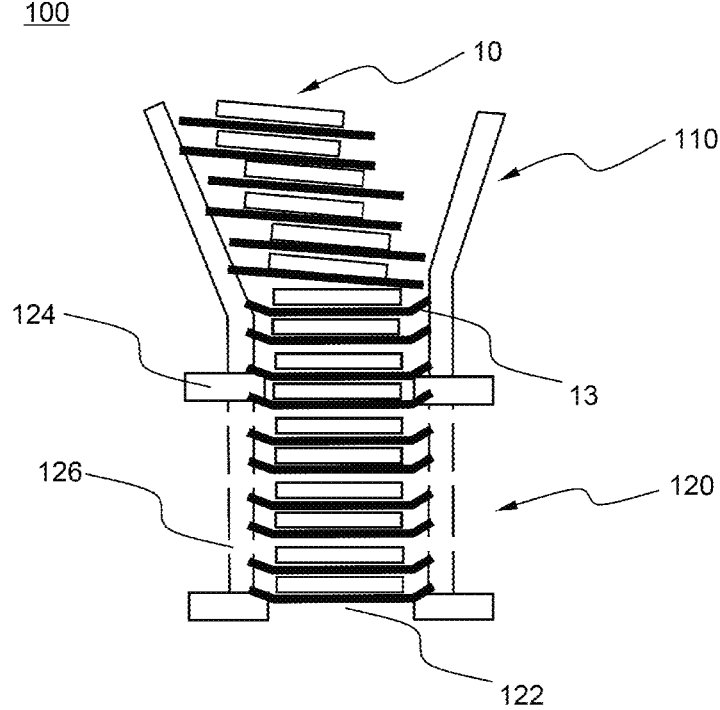
FIG. 2 is a typical view showing a unit cell stacking unit according to an embodiment of the present invention.

FIG. 2 is a typical view showing a unit cell stacking unit according to an embodiment of the present invention.

Referring to FIG. 2 together with FIG. 1, a unit cell stacking unit 100 is configured to have a structure in which unit cells are introduced from above and are sequentially stacked. The unit cell stacking unit 100 includes a hopper type upper part 110, the upper end of which is open and the diameter of which is decreased in the downward direction, and a lower part 120 having an interior size corresponding to a unit cell stack 10.

At the lower part 120 of the unit cell stacking unit 100 is formed a lower discharge port 122, through which the unit cell stack 10 is sequentially discharged.

Also, the lower part 120 of the unit cell stacking unit 100 has an inner diameter larger than the electrode plates 11 and 15 of each of the unit cells and smaller than the separator 13 of each of the unit cells. As a result, the unit cell stack 10 moves downward with force corresponding to the gravity due to elasticity of the separator 13 of each of the unit cells and frictional force against the inner wall of the lower part of the unit cell stacking unit 100 in a state in which the separator 13 is in contact with the inner wall of the lower part of the unit cell stacking unit 100. Consequently, the unit cell stack can be sequentially stacked without being physically pushed.

Also, step protrusions 124 to support the separator 13 of each of the unit cells are formed at a specific region of the lower part 120 of the unit cell stacking unit 100 and at the lower discharge port 122. Consequently, if the unit cell stack 10 exceeds the height of the step protrusion while the unit cell stack 10 is sequentially stacked, the unit cell stack 10 is discharged through the lower discharge port 122.

Meanwhile, through holes 126 for exhaust are formed at the lower part 120 of the unit cell stacking unit 100 to release pressurized air between the separator 13 of each of the unit cells in contact with the inner wall of the lower part and the lower part 120 of the unit cell stacking unit 100 so that the unit cell stack 10 can be easily discharged through the lower discharge port 122.

Figure 3:
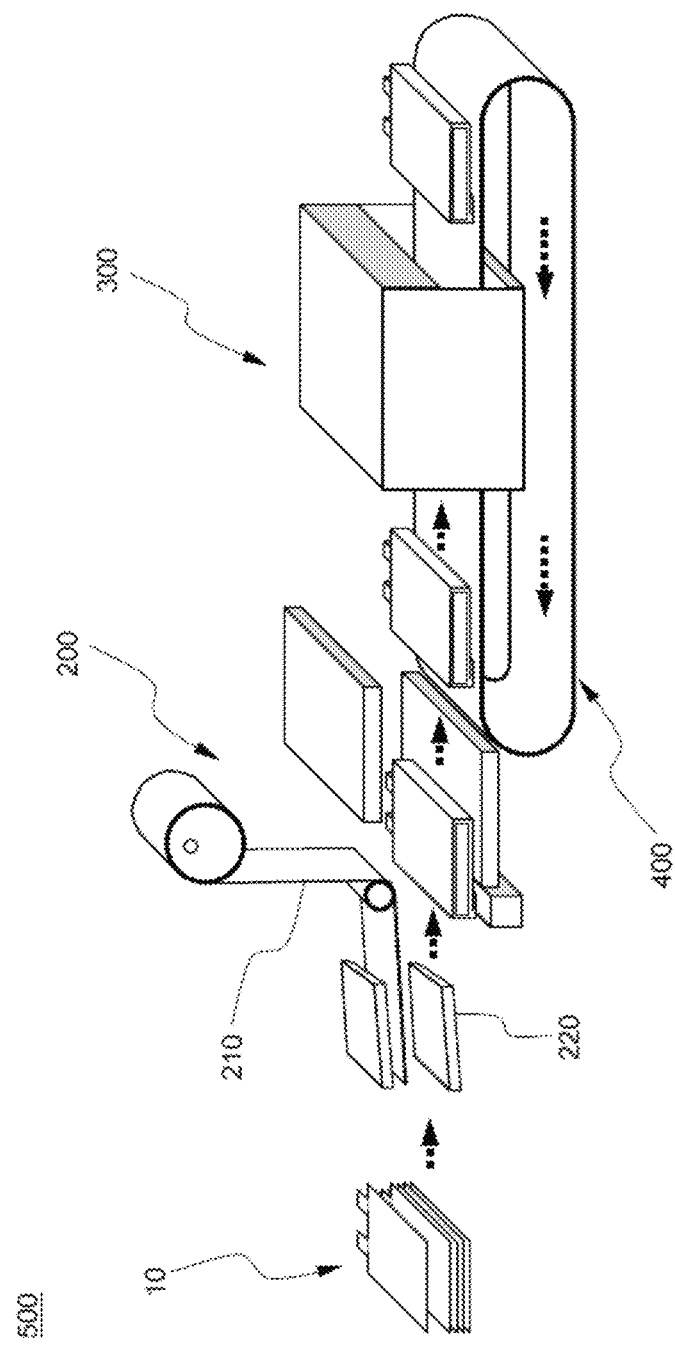
FIG. 3 is a typical view showing a battery cell manufacturing device excluding the unit cell stacking unit of FIG. 2.
Figure 4:
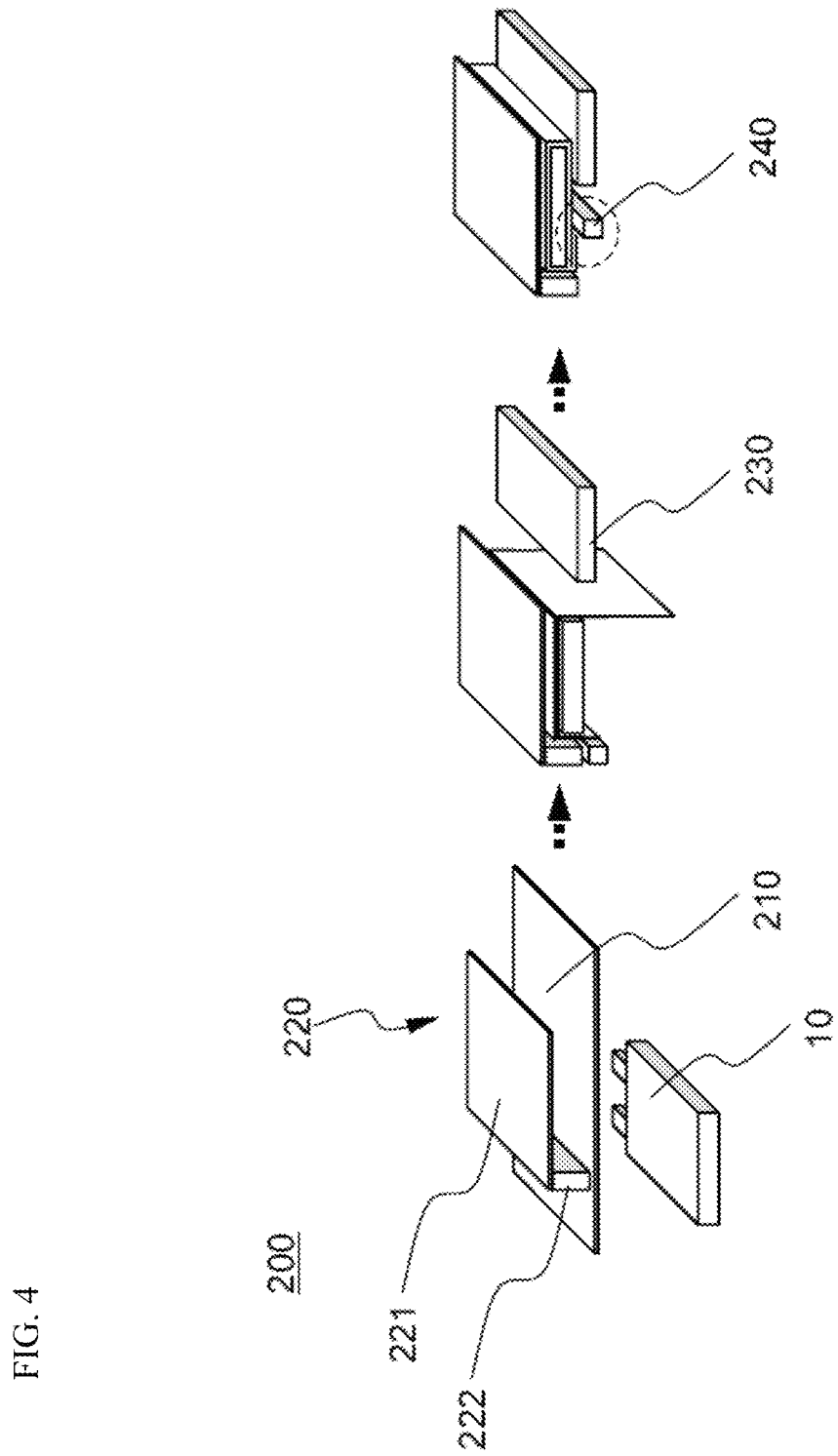
FIG. 4 is a typical view showing a process of wrapping a unit cell stack using a wrapping unit of FIG. 2.

FIG. 3 is a view typically showing a battery cell manufacturing device excluding the unit cell stacking unit of FIG. 2, and FIG. 4 is a view typically showing a process of wrapping a unit cell stack using a wrapping unit of FIG. 2.

Referring to these drawings together with FIG. 2, a battery cell manufacturing device 500 includes a unit cell stacking unit 100, a wrapping unit 200, and a heating unit 300.

The wrapping unit 200 is a device configured to wrap the outside of a unit cell stack 10 discharged from the unit cell stacking unit 100 with a separation film 210. The wrapping unit 200 includes a jig 220 to wrap the top of the unit cell stack 10 with the separation film 210, a wrapping plate 230 to wrap the bottom of the unit cell stack 10 with the separation film 210, and a sealing block 240 to thermally weld an overlapped portion 215 of the separation film 210 in a state in which the top and bottom of the unit cell stack 10 are wrapped with the separation film 210.

Specifically, the jig 220 includes a main jig 221 configured to contact the top of the unit cell stack and a side jig 222 configured to contact the left side of the unit cell stack. Consequently, it is possible for the jig 220 to wrap the unit cell stack 10 with the separation film 210 while supporting the unit cell stack 10.

Also, the wrapping plate 230 moves from the side of the unit cell stack 10 opposite to the side jig 222 toward the side jig 222 in a state in which the top and left side of the unit cell stack 10 are wrapped with the separation film 210 by the jig 220 to wrap the unit cell stack 10 with the separation film 210.

Subsequently, the sealing block 240 moves toward the side jig 222 to thermally weld an overlapped portion (see a dotted circle) of the separation film. The thermally welded separation film 210 is cut by the heat.

The separation film 210 is formed of polypropylene, a polypropylene copolymer or polypropylene blend so that the separation film 210 is disposed between the electrode plates of the unit cells and the unit cell stack to maintain insulation therebetween.

Meanwhile, the unit cell stack 10 is transferred from the wrapping unit 200 to the heating unit 300 by a conveyor belt 400. The heating unit 300 is a high temperature chamber, which thermally shrinks the separation film 210 wrapping the unit cell stack 10 at a temperature of 170° C. to secure a fixed state of the thermally shrunk separation film 210 to the unit cell stack 10 and to protect the unit cell stack 10 from external impact.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As is apparent from the above description, a battery cell manufacturing device according to the present invention is capable of easily stacking unit cells to constitute a unit cell stack, discharges the unit cell stack, wrapping the unit cell stack with a separation film, and thermally shrinking the separation film, thereby improving battery cell manufacturing processability and improving capacity and quality of a battery as compared with another battery of the same standard.

The invention claimed is:

1. A battery cell manufacturing device configured to manufacture a battery cell comprising two or more unit cells, the battery cell manufacturing device comprising:
   a unit cell stacking unit into which unit cells are introduced from above and in which the unit cells are sequentially stacked;

a wrapping unit to wrap an outside of a unit cell stack discharged from the unit cell stacking unit with a separation film; and a heating unit to thermally shrink the separation film wrapping the outside of the unit cell stack, wherein the unit cell stacking unit comprises a hopper type upper part, an upper end of which is open and a diameter of which is decreased in a downward direction, and a lower part having an interior size corresponding to the unit stack, the lower part of the unit cell stacking unit having an inner diameter larger than electrode plates of each of the unit cells and smaller than a separator of each of the unit cells.

2. The battery cell manufacturing device according to claim 1, wherein each of the unit cells is configured to have a structure in which two or more electrode plates are stacked in a state in which the separator is disposed between the electrode plates.

3. The battery cell manufacturing device according to claim 1, wherein the lower part of the unit cell stacking unit is provided with a lower discharge port, through which the unit cell stack is sequentially discharged.

4. The battery cell manufacturing device according to claim 1, wherein the lower part of the unit cell stacking unit is provided with a step protrusion to support a separator of each of the unit cells.

5. The battery cell manufacturing device according to claim 4, wherein the step protrusion is formed at an interface between the upper and lower parts of the unit cell stacking unit, a specific region of the lower part, or a lower discharge port of the lower part.

6. The battery cell manufacturing device according to claim 1, wherein the lower part of the unit cell stacking unit is provided with through holes for exhaust.

7. The battery cell manufacturing device according to claim 1, wherein the wrapping unit comprises:

a jig to wrap a top or bottom of the unit cell stack with the separation film;

a wrapping plate to continuously wrap the bottom or top of the unit cell stack with the separation film in a state in which the top or bottom of the unit cell stack is wrapped with the separation film by the jig; and a sealing block to thermally weld an overlapped portion of the separation film in a state in which the top and bottom of the unit cell stack are wrapped with the separation film.

8. The battery cell manufacturing device according to claim 7, wherein the jig comprises a main jig configured to contact the top or bottom of the unit cell stack and a side jig configured to contact a left side or right side of the unit cell stack.

9. The battery cell manufacturing device according to claim 8, wherein the wrapping plate moves from a side of the unit cell stack opposite to the side jig toward the side jig to wrap the unit cell stack with the separation film.

10. The battery cell manufacturing device according to claim 8, wherein the sealing block moves toward the side jig to thermally weld the overlapped portion of the separation film.

11. The battery cell manufacturing device according to claim 1, wherein the separation film is formed of polypropylene, polypropylene copolymer or polypropylene blend.

12. The battery cell manufacturing device according to claim 1, wherein the heating unit is a chamber of which a temperature is set to thermally shrink the separation film.

13. The battery cell manufacturing device according to claim 1, wherein the separation film is thermally shrunk at a temperature range of 150 to 180° C.

14. The battery cell manufacturing device according to claim 1, wherein the unit cell stack is transferred from the wrapping unit to the heating unit by a conveyor belt.

15. A battery cell manufacturing device configured to manufacture a battery cell comprising two or more unit cells, the battery cell manufacturing device comprising:

a unit cell stacking unit into which unit cells are introduced from above and in which the unit cells are sequentially stacked;

a wrapping unit to wrap an outside of a unit cell stack discharged from the unit cell stacking unit with a separation film; and a heating unit to thermally shrink the separation film wrapping the outside of the unit cell stack, wherein the wrapping unit comprises:

a jig to wrap a top or bottom of the unit cell stack with the separation film;

a wrapping plate to continuously wrap the bottom or top of the unit cell stack with the separation film in a state in which the top or bottom of the unit cell stack is wrapped with the separation film by the jig; and a sealing block to thermally weld an overlapped portion of the separation film in a state in which the top and bottom of the unit cell stack are wrapped with the separation film.

* * * * *